United States Patent [19]

McClelland et al.

[11] Patent Number: 4,542,213
[45] Date of Patent: Sep. 17, 1985

[54] TRIPHENODIOXAZINE ACID DYES

[75] Inventors: Robert D. McClelland, Manchester; Andrew H. M. Renfrew, Bury, both of England

[73] Assignee: Imperial Chemical Industries PLC, London, England

[21] Appl. No.: 590,057

[22] Filed: Mar. 15, 1984

[30] Foreign Application Priority Data

May 4, 1983 [GB] United Kingdom ................. 8312210

[51] Int. Cl.⁴ ........................................... C07D 498/04
[52] U.S. Cl. ....................................... 544/76; 544/77; 8/658
[58] Field of Search ..................................... 544/76, 77

[56] References Cited

U.S. PATENT DOCUMENTS 3,036,071 5/1962 Frey et al. .............................. 544/77
4,472,575 9/1984 Renfrew ................................ 544/76

FOREIGN PATENT DOCUMENTS 1209112 2/1960 France .
308489 9/1955 Switzerland .
745072 2/1956 United Kingdom .
1353604 5/1974 United Kingdom .
1450746 9/1976 United Kingdom .
1477879 6/1977 United Kingdom .

Primary Examiner—Richard L. Raymond
Attorney, Agent, or Firm—Cushman, Darby & Cushman

[57] ABSTRACT

Triphenodioxazine dyes which, in the free acid form, have the formula:

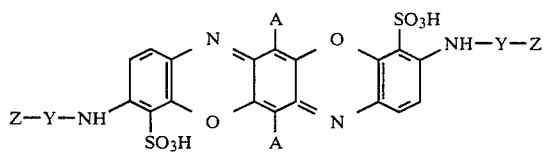

wherein A is Cl or Br;
Y is cyclopentylene, cyclohexylene or $(CH_2)_x$ where x is 2, 3 or 4; and
Z is $NRCO_2R^1$ or

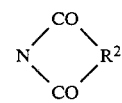

wherein R is H, optionally substituted alkyl or optionally substituted aryl;
$R^1$ is optionally substituted alkyl, optionally substituted cycloalkyl or optionally substituted aryl; and
$R^2$ is —CH=CH—, —CH=CH—CH₂—, —(CH₂)—₂₋₄ or a 1,2-radical of a 5 or 6 membered carbocyclic compound;
or, when Y is cyclopentylene or cyclohexylene, Z may also be H or alkyl, alkoxy, aryl, aryloxy, cycloalkyl, cycloalkoxy or amino, all of which may be optionally substituted.

1 Claim, No Drawings

TRIPHENODIOXAZINE ACID DYES

This invention relates to acid dyes of the triphenodioxazine series.

Dyes of the triphenodioxazine series are well known and often bear sulphonic acid groups making them suitable for colouring various substrates e.g. as direct dyes for cellulose such as paper and as acid dyes for polyamides such as wool and nylon.

We have now discovered a novel class of such dyes which show good properties e.g. strength of colouration often better than closely related known dyes.

According to the present invention there are provided triphenodioxazine dyes which in the free acid form are of the formula:

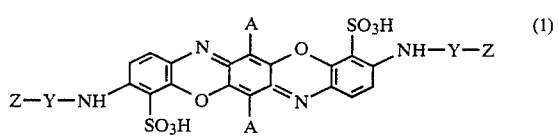  (1)

wherein A is Cl or Br;
Y is cyclopentylene, cyclohexylene or $(CH_2)_x$ where x is 2, 3 or 4; and
Z is $NRCO_2R^1$ or

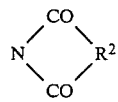

wherein R is H, optionally substituted alkyl or optionally substituted aryl;
$R^1$ is optionally substituted alkyl, optionally substituted cycloalkyl or optionally substituted aryl; and
$R^2$ is $CH=CH-$, $CH=CH-CH_2-$, $(CH_2)_{2-4}$ or a 1,2-radical of a 5 or 6 membered carbocyclic compound;
or, when Y is cyclopentylene or cyclohexylene, Z may also be H or alkyl, alkoxy, aryl, aryloxy, cycloalkyl, cycloalkoxy or amino, all of which may be optionally substituted.

As examples of optionally substituted alkyl or aryl groups represented by R and $R^1$, there may be mentioned methyl, ethyl, 1- and 2-propyl, 1- and 2-butyl, 1-, 2- and 3-hexyl, 1-, 2- and 3-octyl, 2-ethylhexyl, 2-cyanoethyl, 2-hydroxyethyl, 2-hydroxypropyl, 2-chloropropyl, phenyl, tolyl, anisyl, nitrophenyl, sulphophenyl, chlorophenyl, bromophenyl, carboxyphenyl, cyanophenyl, acetylaminophenyl, methoxycarbonylphenyl and ethoxycarbonylphenyl.

As examples of groups represented by $R^2$ there may be mentioned $-CH_2CH_2-$, $-CH_2CH_2CH_2-$, $-CH_2CH(CH_3)-$, $-CH_2CH(C_6H_5)CH_2-$, $-CH_2CH(CH_2C_6H_5)CH_2-$, $-CH_2CHNH_2-$, $-CH_2CH(NHCOCH_3)CH_2-$, $-CCl=CCl-$, 1,2-phenylene, 4-sulpho-1,2-phenylene, 4-methyl-1,2-phenylene, terachloro or tetrabromo-1,2-phenylene, 1,2-cyclohexylene, 1,2-cyclohex-1-enylene, 1,2-cyclohex-4-enylene, 1,2-cyclohexa-1,4-dienylene and 1,2-cyclohexa-2,4-dienylene.

Preferred dyes of formula (1) have one or more of the following features:
(a) A is Cl,
(b) Y is $(CH_2)_x$ with x as 3 or especially 2, or cyclohexylene,
(c) Z is $NRCO_2R^1$, or Z is alkyl when Y is cyclohexylene,
(d) R is $C_{1-4}$ alkyl optionally substituted by Cl or, especially, R is H
(e) $R^1$ is $C_{1-12}$ alkyl or especially $C_{1-6}$ alkyl both optionally substituted by OH, CN or Cl or $R^1$ is phenyl optionally substituted by $C_{1-4}$ alkyl,
(f) $R^2$ is $-(CH_2)_{2\ or\ 3}$, $-CH=CH-$, $-CH=CH-CH_2-$, 1,2-phenylene, tetrachloro- or tetrabromo-1,2-phenylene, 1,2-cyclohexylene, 1,2-cyclohexenylene or 1,2-cyclohexadienylene.

The dyestuffs of formula (1) in which Z contains a nitrogen atom linked to Y (i.e. those groups defined above which may be linked to all possible Y groups) may be conveniently manufactured by reacting an amino triphenodioxazine of the formula:

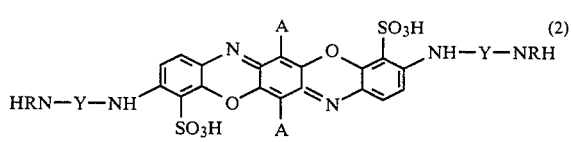  (2)

with a chloroformate $Cl.CO_2R^1$, a dibasic acid $R^2(COOH)_2$ or derivative thereof such as acid chloride or anhydride, where A, $R^1$ and $R^2$ have the meanings given above.

The reaction is carried out under conventional conditions appropriate for the interaction of the above reagents with amino groups. Often this may be conveniently performed in aqueous media at room temperature or slightly above at a mildly alkaline pH e.g. 8 to 9. In some instances where hydrolysis of the reagent is rapid it may be necessary to work in non aqueous media.

The reaction with $R^2(COOH)_2$ is usually most conveniently conducted using the corresponding anhydride which is often the cyclic anhydride

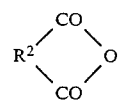

and is confined to reaction with aminotriphenodioxazines of formula (2) in which R is H. The initial reaction product is a dyestuff of formula (1) in which Z is $-NH-COR^2.COOH$. By heating under acidic conditions the dyestuffs of formula (1) with Z as

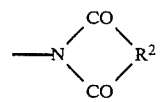

are formed. This cyclisation often takes place readily e.g. at 50° C. in an aqueous medium of mildly acidic pH e.g. 4–5. In other instances higher temperature or use of glacial acetic acid medium may be necessary.

It is often found that the cyclised product is a superior dye to the precursor with Z as $NH.COR^2COOH$. In some instances e.g. the dyeing of wool or nylon normal dyebath temperatures and pH values would be such as to lead to cyclisation.

Examples of suitable reactants for the above process include:
ethyl chloroformate
butyl chloroformate
cyclohexyl chloroformate
phenyl chloroformate
maleic anhydride
succinic anhydride
glutaric anhydride
phthalic anhydride
tetrachlorophthalic anhydride.

The aminotriphendioxazines of formula (2) for use in the above process are obtained by conventional means e.g. a chloroquinone such as tetrachloroquinone of the formula

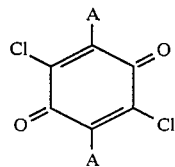
(3)

is reacted with 2 moles of a diamine of the formula:

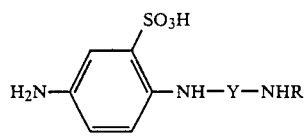
(4)

e.g. N-4-aminophenyl ethylene diamine or N-(4-amino-2-sulphophenyl)ethylene diamine and the resultant dianilide cyclised, A, Y and R having the meanings given above. Oleum is often used for the cyclisation process which may be accompanied by some sulphonation of aromatic groups present.

The dyes of formula (1) in which Y is not linked to a nitrogen atom in Z (i.e. those in which Y can only be cyclohexylene or cyclopentylene) may be manufactured by reacting a chloroquinone of formula (3) as given above with 2 moles of a diamine of the formula (5):

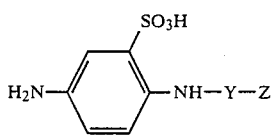
(5)

in which Y is cyclohexylene or cyclopentylene and Z is H or alkyl, alkoxy, aryl, aryloxy, cycloalkyl, cycloalkoxy or amino, all of which may be optionally substituted, and cyclising the resultant dianilide.

The cyclisation of the dianilide may be carried out under conventional conditions e.g. heating in oleum and as previously indicated some sulphonation may accompany this step.

As examples of diamines of formula (5) there may be mentioned:
N-(4'-amino-2'-sulphophenyl)-4-methylcyclohexylamine,
N-(4'-amino-2'-sulphophenyl)-4-ethoxycyclohexylamine,
N-(4'-amino-2'-sulphophenyl)-4-cyclohexylcyclohexylamine,
N-(4'-amino-2'-sulphophenyl)-3-methylcyclopentylamine.

The dyes of this invention may be isolated in the free acid form but it is usually more convenient to have them, at least partially, in the form of salts e.g Na, K, Li or NH$_4$ salts. The dyes all have same solubility in water but in instances where this is low it may aid even dyeing to convert the isolated dye into a finely divided form and mix it with dispersing agent.

The dyes of this invention are valuable dyes usually of a bright blue hue. They may be used as direct dyes for cellulose in the form of fibres or paper. They may also be used as acid dyes e.g. for wool or nylon. They can be applied by conventional colouration techniques such as printing, padding or exhaust dyeing.

The resulting colouration has good fastness properties and the dyes of the present invention frequently show greater tinctorial strength and/or better dyeing behaviour than related known triphenodioxazine dyes e.g. dyes of formula (1) in which Z is H, alkylamino or acetyl- or benzoylamino. They also show advantages over anthraquinone dyes commonly used for bright blue dyes.

The invention is illustrated by the following Examples. The initials M.I. signify "molecular index" which is the weight of any material containing one mole of the pure chemical species named.

EXAMPLE 1

To 3,10-bis-(beta-aminoethylamino)-6,13-dichloro-4,11-disulphotriphenodioxazine (M.I. 2546; 25 g), in water (350 g) at pH 8.0 and 20°, was added succinic anhydride (3 g) dissolved in acetone (50 g). The reaction mixture was stirred for 1 hour, while maintaining the pH at 8.0, then potassium chloride (80 g) was added, and the precipitated carboxyamide filtered off and dried (19.6 g).

The solid was boiled in acetic acid (150 g) for 5 minutes then isolated by filtration to give the bis succinimido derivative (9.6 g), λmax 620 nm.

The dyestuff gave bright blue shades when applied from mildly acid dyebath at 90°–100° C. to nylon which showed excellent fastness to washing and to light.

EXAMPLE 2

To 3,10-bis-(beta-aminoethylamino)-6,13-dichloro-4,11-disulphotriphenodioxazine (M.I. 2131; 42.6 g) in water (400 g) at pH 8.0 and 20°, was added maleic anhydride (7.8 g) and the reaction mixture stirred for 1 hour while maintaining the pH at 8.0.

Hydrochloric acid was then added to give a pH of 4.0, the solution heated to 90° for ½ hour, and finally salted to 10% with potassium chloride. On cooling the bis maleimide was filtered off, washed with potassium chloride solution and oven dried to give the product (18.6 g), λmax 620 nm.

The dyestuff gave clear blue shades on nylon which showed excellent fastness to washing and to light.

EXAMPLE 3

To 3,10-bis-(beta-aminoethylamino)-6,13-dichloro-4,11-disulphotriphenodioxazine (M.I. 2546; 51 g) in water (400 g) at pH 8.0 and 20°, was added phthalic anhydride (8.9 g) dissolved in acetone (75 g). The reaction mixture was stirred for 2 hours, while maintaining the pH at 8.0, then potassium chloride (80 g) was added to salt out the carboxyamide. The solid was isolated by filtration, washed with potassium chloride and dried to give the product, λmax 620, (14 g).

The above compound was ring closed to give the bis phthalimide by the method described in Example 1.

The carboxyamide and the phthalimide both dyed nylon in clear bright blue shades of excellent fastness.

EXAMPLE 4

To 3,10-bis-(beta-aminoethylamino)-6,13-dichloro-4,11-disulphotriphenodioxazine (M.I. 2546; 25 g) in water (400 g) at pH 8.0 and 20°, was added tetrachlorophthalic anhydride (8.6 g) dissolved in dimethylformamide (50 g). The reaction mixture was stirred for 3 hours at room temperature, pH 8.0, the pH dropped to 4.0 with hydrochloric acid, heated to 90° for 10 minutes then cooled and salted to 20% with sodium chloride. The tetrachlorophthalimide product (16 g), λmax 620, dyed nylon in bright blue shades of excellent fastness to water and to light.

EXAMPLE 5

To 3,10-bis-(beta-aminoethylamino)-6,13-dichloro-4,11-disulphotriphenodioxazine (M.I. 2546; 25 g) in water (400 g) at pH 8.5, 25°, was added phenyl chloroformate (5 g) and the reaction mixture stirred at 25°-30°, for 4 hours, while keeping the pH at 8.5. Sodium chloride (20 g) was added, the solid isolated by filtration, washed and oven dried to give the phenyl urethane dyestuff (14 g), λmax 620.

The dyestuff dyed nylon in bright blue shades of excellent fastness to water and to light.

EXAMPLE 6

To 3,10-bis(beta-aminoethylamino)-6,13-dichloro-4,11-disulphotriphenodioxazine (M.I. 2546; 25 g) in water (400 g) at pH 8.5, was added n-butyl chloroformate (4 g) and the reaction mixture stirred for 1½ hours at 25°-30°, while keeping the pH at 8.5. Sodium chloride (20 g) was added, the solid isolated by filtration, washed with water and oven dried to give the n-butyl urethane dyestuff (10 g); λmax 618 nm.

The dyestuff dyed nylon and wool in bright blue shades of excellent fastness to water and to light.

EXAMPLE 7

To 3,10-bis(beta-aminoethylamino)-6,13-dichloro-4,11-disulphotriphenodioxazine (M.I. 2546; 25 g) in water (400 g) at pH 8.5, was added cyclohexyl chloroformate (4 g) and the reaction mixture stirred for 2 hours at 25°-30°, while keeping the pH at 8.5. Sodium chloride (20 g) was added, the solid isolated by filtration, washed with water and oven dried to give the cyclohexyl urethane dyestuff (9 g); λmax 620 nm.

The dyestuff dyed nylon and wool in bright blue shades of excellent fastness to water and to light.

Further Examples of dyestuffs of Formula I were prepared in a similar manner and are identified in Table 1 by the substituents A, Y and Z.

TABLE 1

| Example | A | Y | Z | λ$_{max}$ |
|---|---|---|---|---|
| 8 | Cl | —CH$_2$CH$_2$— | —NHCOOC$_2$H$_5$ | 620 |
| 9 | " | " | —NHCOOC$_3$H$_7$ | 620 |
| 10 | " | " | —NHCOOC$_9$H$_{19}$ | 625 |

TABLE 1-continued

| Example | A | Y | Z | λ$_{max}$ |
|---|---|---|---|---|
| 11 | " | —CH$_2$CH$_2$CH$_2$— | —NHCOOCH(CH$_3$)—(CH$_2$)$_5$CH$_3$ | 615 |
| 12 | Br | —CH$_2$CH$_2$— | —NHCOO—C$_4$H$_9$ | 620 |
| 13 | Cl | " | —NHCOO—(2,6-dimethylphenyl) | 630 |
| 14 | " | " | —NHCOO—(2,4-dimethylphenyl) | 626 |

EXAMPLE 15

(a) To 4-chloro-3-sulphonitrobenzene (130 g) in water (2 liters) was added cyclohexylamine (75 ml) and sodium carbonate (26.5 g). The reaction mixture was heated at 90° for 10 hours, cooled and the solid so formed isolated by filtration to give 4-cyclohexylamino-3-sulphonitrobenzene (120 g).

(b) The above nitro compound (120 g) in water (3 liters) and palladium charcoal (5%; 2 g) was hydrogenated at room temperature and atmospheric pressure to give 4-cyclohexylamino-3-sulphoaniline which was filtered to remove catalyst but was not isolated.

(c) To the above solution was added charcoal (150 g) and the reaction mixture heated at 50°, pH 7.0, for 4 hours. The pH of the solution was lowered to 3, salt (20%) added and the derived dianilide isolated by filtration to give the product (146 g; M.I. 970).

(d) The above dianilide (97 g) in 20% oleum (900 g) at 20° was stirred for 8 hours. Drowning into ice (5 liters) gave a blue solid which was isolated by filtration, washed with saturated brine and oven dried to give 3,10-bis(beta-cyclohexylamino)-6,13-dichloro-4,11-disulphotriphenodioxazine (106 g; M.I. 1500).

The dyestuff dyed nylon and wool in bright blue shades of excellent fastness to water and to light.

The Examples listed in Table 2 were prepared in a manner similar to Example 15, the dyestuffs being identified by the substituents A, Y and Z.

TABLE 2

| Example | A | Y | Z | λ$_{max}$ |
|---|---|---|---|---|
| 16 | Cl | cyclohexyl | p-methyl | 620 |
| 17 | " | " | p-t-butyl | 620 |
| 18 | " | " | p-dodecyl | 622 |
| 19 | " | " | p-methoxy | 620 |
| 20 | " | " | o-cyclohexyl | 618 |
| 21 | " | " | m-methyl | 617 |
| 22 | " | " | p-propyl | 620 |
| 23 | " | " | p-isopropyl | 620 |
| 24 | " | " | p-n-butyl | 621 |
| 25 | " | " | p-isopropoxy | 620 |
| 26 | " | " | p-amyl | 619 |
| 27 | " | " | p-hexyl | 622 |
| 28 | " | " | p-heptyl | 617 |
| 29 | " | " | p-octyl | 618 |
| 30 | " | " | p-nonyl | 620 |
| 31 | " | " | p-decyl | 620 |

TABLE 2-continued

| Example | A | Y | Z | $\lambda_{max}$ |
|---|---|---|---|---|
| 32 | " | " | p-methoxyethoxy | 620 |
| 33 | " | cyclopentyl | hydrogen | 618 |
| 34 | " | " | 3-methyl | 620 |
| 35 | Br | cyclohexyl | p-ethyl | 620 |

We claim:

1. A triphenodioxazine dye which, in the free acid form, has the formula:

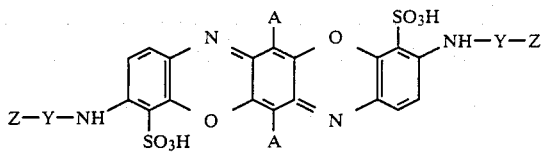

wherein A is Cl or Br;
Y is $(CH_2)_x$ in which x is 2, 3 or 4; and
Z is $NRCO_2R^1$ or

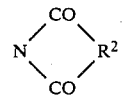

wherein R is H;
$R^1$ is alkyl, cycloalkyl or aryl; and
$R^2$ is $-CH=CH-$, $-CH=CH-CH_2-$, $-(CH_2)_{2-4}-$ or a 1,2 radical of a 5 or 6 membered carbocyclic compound.

* * * * *